US012789580B2

(12) United States Patent
Ailloud et al.

(10) Patent No.: US 12,789,580 B2
(45) Date of Patent: Nov. 10, 2026

(54) VENTILATION DEVICE FOR A VEHICLE VENTILATION, HEATING AND/OR AIR-CONDITIONING SYSTEM

(71) Applicant: VALEO SYSTEMES THERMIQUES, La Verriere (FR)

(72) Inventors: Fabrice Ailloud, La Verriere (FR); Oliver Lauer, La Verriere (FR); Nestor Ismael Varela Santoyo, La Verriere (FR); Bruno Demory, La Verriere (FR); Mohamed Alaoui Benzakroum, La Verriere (FR); Manuel Henner, La Verriere (FR); Maxime Laurent, La Verriere (FR)

(73) Assignee: Valeo Systemes Thermiques, La Verriere (FR)

( * ) Notice: Subject to any disclaimer, the term of this patent is extended or adjusted under 35 U.S.C. 154(b) by 579 days.

(21) Appl. No.: 18/001,641

(22) PCT Filed: Jun. 16, 2021

(86) PCT No.: PCT/EP2021/066175
§ 371 (c)(1),
(2) Date: Dec. 13, 2022

(87) PCT Pub. No.: WO2021/255063
PCT Pub. Date: Dec. 23, 2021

(65) Prior Publication Data

US 2023/0219394 A1 Jul. 13, 2023

(30) Foreign Application Priority Data

Jun. 16, 2020 (FR) ....................................... 2006292

(51) Int. Cl.
*B60H 1/00* (2006.01)

(52) U.S. Cl.
CPC ..... *B60H 1/00471* (2013.01); *B60H 1/00514* (2013.01)

(58) Field of Classification Search
CPC ............ B60H 1/00471; B60H 1/00514; B60H 2001/00092; B60H 1/00028; F04D 17/165; F04D 29/444
(Continued)

(56) References Cited

U.S. PATENT DOCUMENTS 9,810,239 B2 11/2017 Hayamitsu
10,118,502 B2 * 11/2018 Yokote ................ H01M 10/663
(Continued)

FOREIGN PATENT DOCUMENTS

CN 204851785 U 12/2015
CN 105317747 A 2/2016
(Continued)

OTHER PUBLICATIONS

Japan Patent Office, Office Action (with English translation) of corresponding Japanese Patent Application No. 2022-577320, dated Mar. 1, 2024.
(Continued)

*Primary Examiner* — Allen R. B. Schult
*Assistant Examiner* — William C Weinert
(74) *Attorney, Agent, or Firm* — Osha Bergman Watanabe & Burton LLP

(57) ABSTRACT

The invention relates to a ventilation device for a vehicle ventilation, heating and/or air-conditioning system, including at least one housing that includes at least one wall defining an inner volume in which at least one radial propeller capable of being rotated and at least one guide member are received, the radial propeller and the guide member being configured to generate an air flow having a general direction parallel to an axis of rotation of the radial
(Continued)

propeller between an air inlet of the radial propeller and an air outlet formed in the wall of the housing of the ventilation device, at least a part of the wall of the housing being configured to straighten the air flow at the outlet of the radial propeller. The guide member is configured to direct the air flow towards the axis of rotation of the radial propeller.

20 Claims, 8 Drawing Sheets

(58) Field of Classification Search
USPC ........................................................ 454/140
See application file for complete search history.

(56) References Cited

U.S. PATENT DOCUMENTS

| | | | | |
|---|---|---|---|---|
| 10,612,563 | B2 | 4/2020 | Sato | |
| 2017/0096079 | A1 | 4/2017 | Yokote et al. | |
| 2017/0210198 | A1 | 7/2017 | Person et al. | |
| 2019/0003491 | A1 | 1/2019 | Lofy et al. | |
| 2020/0156433 | A1 * | 5/2020 | Yonezu | F04D 27/005 |

FOREIGN PATENT DOCUMENTS

| | | | | | |
|---|---|---|---|---|---|
| CN | 105782076 | A | * | 7/2016 | F04D 25/06 |
| CN | 106457964 | A | | 2/2017 | |
| CN | 107850324 | A | * | 3/2018 | F04D 25/08 |
| CN | 210660750 | U | | 6/2020 | |
| JP | H02114797 | U | | 4/1990 | |
| JP | H09100800 | A | | 4/1997 | |
| JP | 2005075347 | | | 3/2005 | |
| JP | 2005098657 | A | * | 4/2005 | B60H 1/00471 |
| JP | 2014055568 | A | | 3/2014 | |
| JP | 2016033352 | A | | 3/2016 | |
| KR | 20140054655 | A | | 5/2014 | |
| KR | 20140126501 | A | | 10/2014 | |

OTHER PUBLICATIONS

China Patent Office, Office Action (with English translation) of corresponding Chinese Patent Application No. 202180042478.9, dated Dec. 9, 2024.
European Patent Office, International Search Report (with English translation) and Written Opinion of corresponding International Application No. PCT/EP2021/066175, dated Sep. 8, 2021.

* cited by examiner

VENTILATION DEVICE FOR A VEHICLE VENTILATION, HEATING AND/OR AIR-CONDITIONING SYSTEM

TECHNICAL FIELD

The present invention relates to the field of ventilation, heating and/or air-conditioning systems intended to be integrated into motor vehicles, for example, electric propulsion motor vehicles

BACKGROUND OF THE INVENTION

Motor vehicles conventionally comprise a ventilation, heating and/or air-conditioning system intended for heat treating an air flow intended to be directed into a passenger compartment of this vehicle. These ventilation, heating and/or air-conditioning systems comprise at least one casing, in which at least one heat exchanger and at least one ventilation device are accommodated. For example, a heat transfer fluid, i.e., a fluid capable of collecting, carrying and delivering calories, circulates in this heat exchanger. An air flow also passes through this heat exchanger, which air flow, by passing through the heat exchanger, undergoes a change in temperature before being directed into the passenger compartment so as to thermally treat the temperature thereof.

In order to generate the air flow that is capable of passing through the heat exchanger, the ventilation, heating and/or air-conditioning system conventionally comprises at least one ventilation device, which comprises at least one propeller accommodated in a housing, with this propeller being rotated by a movement component that also can be accommodated in the housing. The ventilation devices that are currently implemented comprise an axial air inlet, i.e., an opening that allows the air flow to enter the ventilation device in a direction parallel, or substantially parallel, to an axis of rotation of the propeller of this ventilation device, and a radial air outlet where the air flow exits in a radial direction from the propeller. In other words, such a ventilation device is conventionally arranged in a volute so that the air flow enters the ventilation device in a first direction and exits this housing in a second direction perpendicular to the first direction.

A disadvantage of these ventilation devices is that they are particularly bulky due to the radial nature of the air flow exiting the device. Therefore, they cannot be easily installed in particularly confined ventilation systems.

Document KR 2014/0054655 A describes, for example, a ventilation device in which the air flow circulates in a general direction parallel to an axis of rotation of a propeller of this ventilation device, between an air inlet of this propeller and an outlet of the ventilation device. A disadvantage of the ventilation device described in this document lies in the fact that the air flow tends to exit the ventilation device via a peripheral portion of the outlet opening formed in the housing. In other words, a flow rate of the air flow measured in a peripheral portion of the air outlet opening formed in the housing of the ventilation device is greater than a flow rate of this air flow measured in a central portion of this air outlet opening. The air outlet openings of this type of ventilation device can be closed by an air filter. Thus, the difference in the flow rate between the peripheral portion and the central portion of the air outlet opening can result in the non-optimized use of such an air filter, which can lead to this air filter needing to be replaced more frequently than if the flow rate of the air flow was constant, or substantially constant, over the entire surface of the air outlet opening, i.e., both in the central portion and in the peripheral portion of this air outlet opening.

The present invention falls within this context and aims to address at least the cited disadvantages by proposing a ventilation device that is less bulky than the ventilation devices of the prior art and in which the air flow has a substantially constant flow rate at all points of the air outlet opening.

SUMMARY OF THE INVENTION

An aim of the present invention thus relates to a ventilation device for a vehicle ventilation, heating and/or air-conditioning system, comprising at least one housing, which comprises at least one wall defining an inner volume, in which at least one radial propeller capable of being rotated and at least one guide member are accommodated, the radial propeller and the guide member being configured to generate an air flow having a general direction parallel to an axis of rotation of the radial propeller between an air inlet of the radial propeller and an air outlet opening formed in the wall of the housing of the ventilation device, with at least part of the wall of the housing being configured to straighten the air flow exiting the radial propeller. According to the invention, the guide member is configured to direct the air flow toward the axis of rotation of the radial propeller.

A "radial propeller" is understood to mean a propeller in which the air flow enters in a first direction, in this case parallel to the axis of rotation of this propeller, and exits in a second transverse direction, for example, perpendicular, to the axis of rotation of this propeller. In other words, the radial propeller, within the meaning of the invention, comprises an axial air inlet and a radial air outlet. "At least part of the wall of the housing is configured to straighten the air flow" is understood to mean the fact that this wall has a shape that is designed so that, when the air flow exits the radial propeller, it meets this part of the wall of the housing, causing this air flow to deviate in order to be straightened, i.e., to direct it toward the guide member. Thus, the shape of the housing of this ventilation device and the air flow guide member accommodated in this ventilation device together allow the air flow generated by the rotation of the radial propeller to be channeled so that the overall bulk of this ventilation device compared to the ventilation devices of the prior art is reduced. The air outlet of the ventilation device according to the invention thus can be placed in the axial extension of the radial propeller, which allows the radial bulk of such a device to be reduced. As a result, the ventilation device according to the invention can be more easily installed inside small vehicles, such as, for example, vehicles that are at least partly electrically propelled. For example, the radial propeller can be rotated by a movement component. Optionally, a support of this movement component can be accommodated in the inner volume of the housing. The ventilation device according to the invention allows homogeneous distribution of the air flow to be obtained over the entire surface of the outlet opening formed in the wall of the housing, even in the presence of the support axially placed at the center of the outlet opening formed in the wall of the housing, by tilting the air flow so that it joins the part of the outlet opening where the axis of rotation of the radial propeller passes.

According to the invention, the air flow guide member can comprise a plurality of fixed blades axially disposed between the radial propeller and the air outlet opening. For example, at least one fixed blade of the air flow guide member comprises at least one outer end rigidly connected to the wall of the housing. Advantageously, each fixed blade of the air flow guide member comprises an outer end rigidly connected to the wall of the housing.

According to one feature of the invention, the radial propeller comprises a plurality of movable blades, with each movable blade comprising an inner edge oriented toward the axis of rotation of the radial propeller and an outer edge oriented away from the inner edge, with at least one outer edge extending parallel to the axis of rotation of the radial propeller. Advantageously, the outer edges of each of the movable blades each extend in a direction parallel to the axis of rotation of the radial propeller.

According to another feature of the invention, an inner radius of the radial propeller, measured between the axis of rotation of the radial propeller and the inner edge of one of the movable blades of the radial propeller, in a plane perpendicular to the axis of rotation of the radial propeller, ranges between 36 mm and 54 mm. For example, an outer radius of this radial propeller, measured between its axis of rotation and the outer edge of one of the movable blades of the radial propeller, in the plane perpendicular to the axis of rotation, can range between 64 mm and 96 mm.

Advantageously, the inner edge of a movable blade has a height, measured parallel to the axis of rotation of the radial propeller, that is greater than a height of the outer edge of this movable blade, measured parallel to the axis of rotation of the radial propeller. For example, provision can be made for a ratio between the height of the inner edge of a movable blade of the radial propeller and the height of the outer edge of this movable blade of the radial propeller to range between 1.1 and 1.9. For example, the height of the inner edge of a movable blade of the radial propeller can range between 36 mm and 54 mm and the height of the outer edge of this same movable blade of the radial propeller can range between 29 mm and 44 mm. Also, the inner edge of a movable blade of the radial propeller and the outer edge of this movable blade of the radial propeller can assume different positions, i.e., have an offset relative to each other, along the axis of rotation of the radial propeller.

More specifically, the movable blades of the radial propeller respectively extend between a bowl of the propeller and an edge of the propeller, with the bowl of the propeller having a convex shape when viewed from the movable blades of this radial propeller, with the height of the inner edge of a movable blade and the height of the outer edge of this mobile blade respectively being measured between the bowl of the propeller and the edge of the propeller, parallel to the axis of rotation of this radial propeller.

According to one feature of the invention, each movable blade of the radial propeller is defined by at least one upper line oriented toward the air inlet of the radial propeller and by at least one lower line oriented toward the air outlet opening formed in the wall of the housing, and the upper line of at least one movable blade of this radial propeller has at least one first portion that projects from the edge of the radial propeller toward the axis of rotation of this radial propeller, and a second portion covered by this edge of the radial propeller. Advantageously, all the upper lines of the movable blades of the radial propeller have this first portion and this second portion. The bowl of the radial propeller is more specifically arranged so as to connect the lower lines of the movable blades of this radial propeller. Advantageously, this bowl of the radial propeller can be closed, i.e., this bowl continuously extends between two successive movable blades. As a result, the entire air flow generated by the rotation of the radial propeller exits this radial propeller via its radial air outlet.

According to another feature of the invention, the housing of the ventilation device comprises at least one upper part that houses the radial propeller and a lower part that houses the guide member, with the upper part comprising at least one first convex curvature when viewed from the axis of rotation of the radial propeller and at least one second concave curvature when viewed from the axis of rotation of the radial propeller, the first curvature covering the edge of the radial propeller and the second curvature being arranged facing the radial air outlet of the radial propeller. More specifically, the first curvature covers the edge of the radial propeller, when viewed in a plane perpendicular to the axis of rotation of this radial propeller. Similarly, the second curvature is arranged facing the radial air outlet of the radial propeller, in a plane perpendicular to the axis of rotation of this radial propeller. In other words, the second curvature of the upper part of the housing is arranged so that the air flow exiting the radial propeller meets this second curvature, so that this second curvature forms the part of the housing that is configured to straighten the air flow that exits the radial propeller.

According to one feature of the invention, the air flow guide member comprises a plurality of fixed blades, with at least one fixed blade of this air flow guide member comprising a pressure face and a suction face connected together by a leading edge and a trailing edge, with the fixed blade comprising a cross-section, when viewed in a plane perpendicular to a radial extension axis of the relevant fixed blade, that extends along a camber line between the leading edge and the trailing edge, with this camber line being inscribed in a circle, with a first angle being formed between a tangent to the circle at the leading edge and the camber line at the leading edge and a second angle being formed between the tangent to the circle at the leading edge and the camber line at the trailing edge, the first angle ranging between 3° and 10° and the second angle ranging between 79° and 128°. For example, the fixed blades of the guide member can be arranged as a circular profile, with a center of this circular profile forming a center of the guide member. Advantageously, all the fixed blades of the air flow guide member can be structurally identical.

According to one feature of the invention, at least one fixed blade of the air flow guide member comprises a first portion, a second portion and a third portion aligned in this order along the radial extension axis of the fixed blade toward the wall of the housing, with a ratio between the first angle and the second angle measured in the first portion ranging between 0.03 and 0.07, the ratio between the first angle and the second angle measured in the second portion ranging between 0.05 and 0.12 and the ratio between the first angle and the second angle measured in the third portion ranging between 0.02 and 0.07. Advantageously, the first portion, the second portion and the third portion are integrally formed, i.e., they form a single assembly that cannot be separated without causing damage to at least one of these portions.

According to the invention, the radial propeller is capable of being rotated by at least one movement component, with the housing comprising at least one support capable of accommodating the at least one component for moving the radial propeller, and the guide member being interposed between the support capable of accommodating the at least one movement component and the wall of the housing. According to a particular application example of the invention, a center of the guide member and a center of the support of the movement component are coincident.

According to one embodiment of the invention, the air flow guide member comprises a plurality of fixed blades, with at least one fixed blade of this air flow guide member comprising at least one inner end rigidly connected to the support capable of accommodating the movement component and at least one outer end rigidly connected to the wall of the housing. In other words, it is understood that the air flow guide member is fixed relative to the housing. Advantageously, all the fixed blades of the air flow guide member can comprise an inner end rigidly connected to the support of the movement component and at least one outer end rigidly connected to the wall of the housing. Optionally, the housing, the air flow guide member and the support of the movement component can be one-piece, i.e., form a single assembly that cannot be separated without causing damage to at least the housing, the air flow guide member and/or the support.

Optionally, an air filter can be arranged facing the air outlet opening formed in the wall of the housing. Advantageously, the air filter can close the air outlet opening of the housing. In other words, the air flow guide member then allows, by deviating the air flow that exits the radial propeller, the entire available surface of the air filter to be used, thus improving the efficiency and durability of this air filter.

Advantageously, the ventilation device comprises the component for moving the radial propeller. For example, the component for moving the radial propeller can be a direct current electric motor that comprises a drive shaft capable of being accommodated in the hub of the radial propeller. It is therefore understood from the above that, if necessary, the movement component is accommodated in the housing, on the support provided to this end.

The present invention also relates to a ventilation, heating and/or air-conditioning system for a vehicle, comprising at least one ventilation device as mentioned above, the ventilation system comprising at least one heat exchanger configured to exchange heat between the air flow generated by the radial propeller and a coolant. "Coolant" is understood to mean a fluid configured to carry and exchange calories by changing or not changing state.

BRIEF DESCRIPTION OF DRAWINGS

Further features, details and advantages will become more clearly apparent upon reading the detailed description that is provided hereafter for illustrative purposes, with reference to the various views of the invention shown in the following figures.

DETAILED DESCRIPTION OF THE INVENTION

The features, alternative embodiments and the various embodiments of the invention can be combined together, in various combinations, as long as they are not incompatible or mutually exclusive to each other. In particular, alternative embodiments of the invention can be contemplated that comprise only a selection of the features described below in isolation from the other features described, if this selection of features is sufficient to provide a technical advantage or to distinguish the invention from the prior art.

Figure 1:
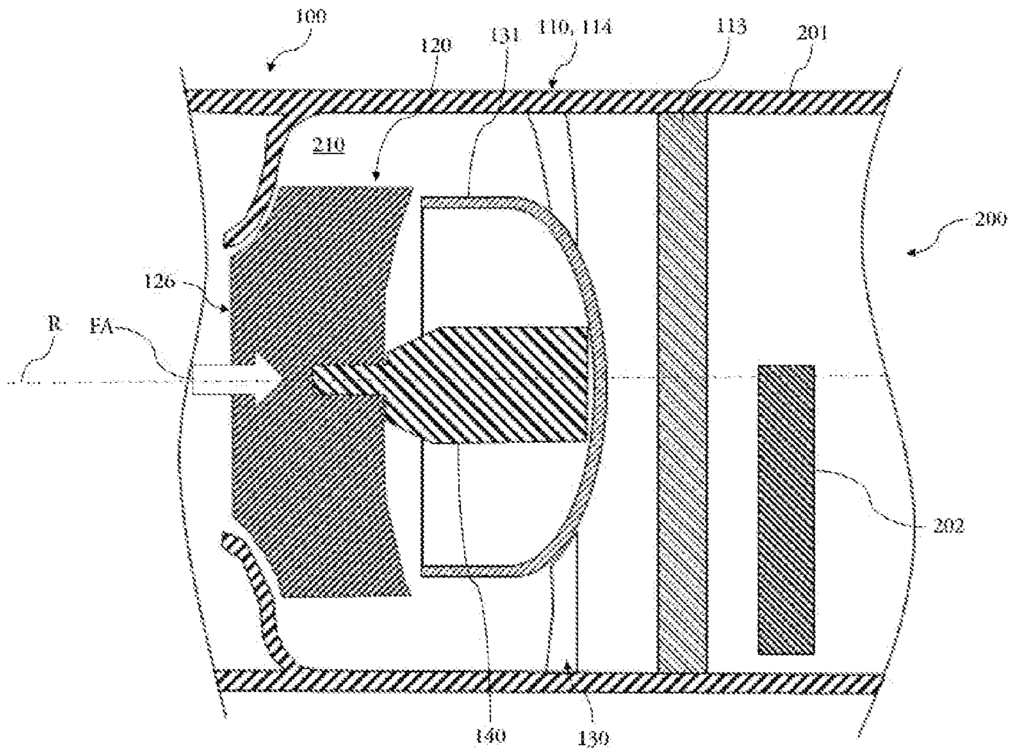
FIG. 1 schematically shows part of a ventilation, heating and/or air-conditioning system according to the invention comprising at least one ventilation device according to the invention.

FIG. 1 schematically shows part of a ventilation, heating and/or air-conditioning system 200 according to the invention. This ventilation, heating and/or air-conditioning system 200, hereafter called "system 200", is intended to be integrated into a motor vehicle, for example, an electric propulsion motor vehicle, so as to thermally treat an air flow FA before it is directed into a passenger compartment of the vehicle for the thermal treatment thereof. In other words, this air flow FA is used to cool or heat the passenger compartment of the vehicle. The system 200 according to the invention comprises at least one casing 201, in which at least one heat exchanger 202 is housed that is configured to exchange heat between a coolant and the air flow FA intended to be directed into the passenger compartment of the vehicle and at least one ventilation device 100 according to the invention configured to generate the air flow FA. The casing 201 advantageously allows the treated air flow FA to be directed toward the passenger compartment of the vehicle. "Coolant" is understood herein to mean a fluid configured to carry and exchange calories by changing or not changing state.

As shown, the ventilation device 100 according to the invention comprises at least one housing 110, which comprises at least one wall 114 that defines an inner volume 210, in which at least one movement component 140, a radial propeller 120, at least one air flow FA guide member 130 and at least one air filter 113 are accommodated. Advantageously, the air filter 113 is axially arranged between the guide member 130 and the heat exchanger 202. The movement component 140 is configured to rotate the radial propeller 120 about an axis of rotation R so as to generate the air flow FA, and the guide member 130, for its part, together with at least part of the wall 114 of the housing 110, assists the straightening of the air flow FA so that the air flow has a general direction of movement, between an air inlet 126 of the radial propeller 120 and an outlet opening formed in the wall 114 of the housing 110, parallel to the axis of rotation R of the radial propeller 120. As described in further detail hereafter, at least one support 131 of the movement component 140 of the radial propeller 120 is also accommodated in the inner volume 210 of the housing 110 of the ventilation device, with the air flow FA guide member 130 being interposed between this support 131 and the wall 114 of the housing 110.

According to the example shown in FIG. 1, the housing 110 of the ventilation device and the casing 201 of the system 200 are integrally formed, i.e., they form a single assembly that cannot be separated without causing damage to the housing 110 and/or the casing 201.

With reference to FIGS. 2 to 8, the ventilation device 100 according to the invention will now be described in further detail.

Figure 2:
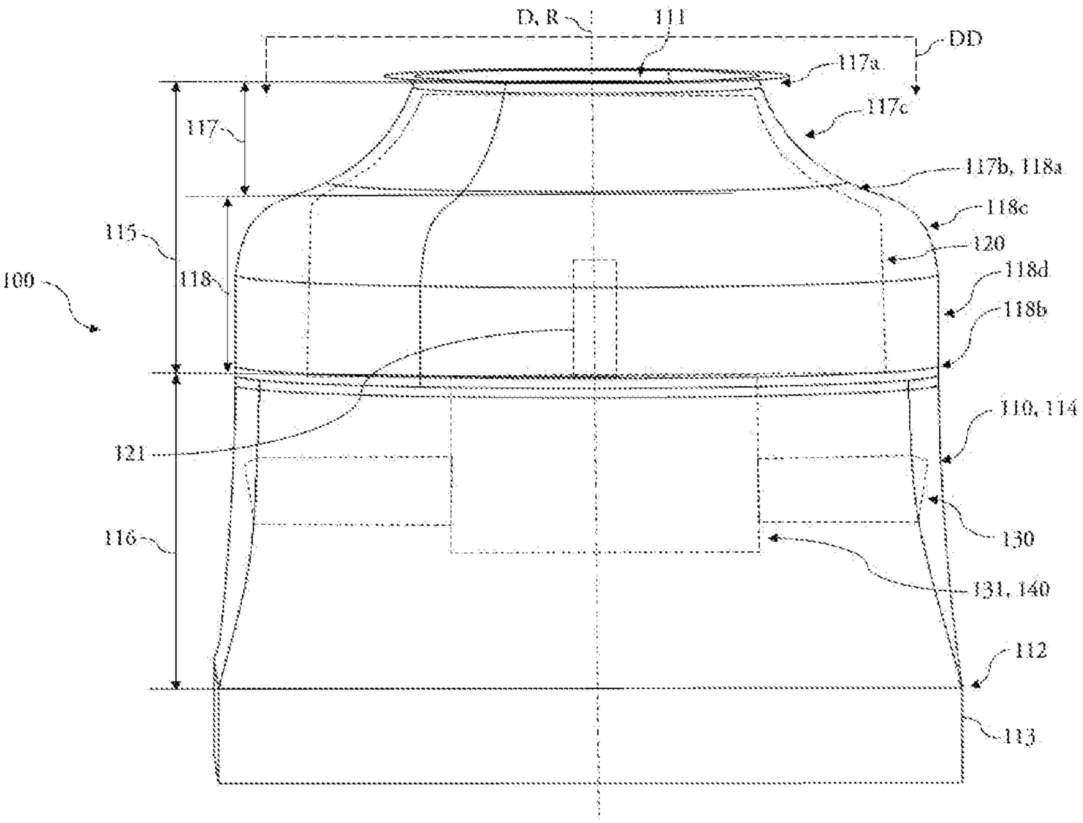
FIG. 2 shows a perspective view of the ventilation device according to the invention.

FIG. 2 shows a perspective view of this ventilation device 100, which comprises at least the housing 110, in which at least one air inlet opening 111 and one air outlet opening 112 are formed, with the air outlet opening 112 being, for example, at least partially closed by an air filter 113. More specifically, the air inlet opening 111 and the air outlet opening 112 are respectively formed in the wall 114 of the housing 110. Advantageously, the air filter 113 can completely close the air outlet opening 112, thereby ensuring that all the air expelled from the ventilation device 100 passes through this air filter 113 before being directed to the passenger compartment of the vehicle.

According to the example shown, the ventilation device 100 extends along a main extension line D, with the air inlet opening 111 and the air outlet opening 112 extending in planes parallel and perpendicular, or substantially parallel and perpendicular, to this main extension line D.

The housing 110, and more specifically the wall 114 of this housing 110, is generally bell-shaped, i.e., this housing 110 has a cross-section, when viewed in a plane perpendicular to the main extension line D of the housing 110, with dimensions that increase from the air inlet opening 111 toward the air outlet opening 112.

As mentioned above, the wall 114 of the housing 110 defines an inner volume of the ventilation device 100, which houses at least the radial propeller 120 configured to be rotated by the movement component 140 and the guide member 130 configured to direct at least some of the air flow generated by the rotation of the radial propeller 120 toward the axis of rotation R of this radial propeller 120, after it passes through the guide member 130. The radial propeller 120 is capable of being rotated by the movement component 140 accommodated in the support 131. For example, the movement component 140 can be an electric motor that comprises at least one stator and at least one rotor, with the rotor being rotationally connected to a shaft accommodated in a hub 121 of the radial propeller 120. In other words, the axis of rotation R of the radial propeller 120 extends parallel to this hub 121.

In FIG. 2, the movement component 140, as well as its support 131, the radial propeller 120 and the guide member 130, are schematically shown as dashed lines. As shown, the radial propeller 120 and the guide member 130 are arranged, in this order, along the axis of rotation R of the radial propeller 120, between the inlet opening 111 and the outlet opening 112 formed in the wall 114 of the housing 110. The guide member 130 is interposed between the movement component 140 and the wall 114 of the housing 110. More specifically, the guide member 130 is interposed between the support 131 of this movement component 140 and the wall 114 of the housing 110. "Radial propeller" is understood to mean a propeller for which the air enters in a direction parallel to the axis of rotation R of this propeller and exits in a direction transverse to the axis of rotation R of the propeller. As described hereafter, the axis of rotation R of the radial propeller in the example shown is parallel to the main extension axis D of the housing 110.

The housing 110 comprises at least one upper part 115, which houses the radial propeller 120 and a lower part 116, which houses the air flow guide member 130. For example, the upper part 115 and the lower part 116 of this housing 110 can be one-piece, i.e., they then form a single assembly that cannot be separated without causing damage to at least one of these parts.

The upper part 115 comprises at least one first portion 117 that is flared toward the outlet opening 112 formed in the wall 114 of the housing 110, at the end of which the air inlet opening 111 is formed, and at least one second portion 118 that is at least partially curved. As shown, the first flared portion 117 has an axis of revolution coincident with the main extension line D of the housing 110, and the second cylindrical portion 118 has an axis of revolution that is also coincident with the main extension line D of the housing 110. More specifically, the first portion 117 extends between a first end **117*a*, at which the air inlet opening 111 is formed, and a second end 117*b* opposite the first end 117*a*, along the main extension line D of the housing 110. The second portion 118 for its part extends between a first end 118*a* and a second end 118*b* opposite each other along the main extension line D of the housing 110. As shown, the first end 118*a* of the second portion 118 and the second end 117*b* of the first portion 117** are coincident.

The first portion 117 of the upper part 115 of the housing 110 has a first curvature **117*c* that extends between the first end 117*a* and the second end 117*b*. The second portion 118 for its part comprises at least one second curvature 118*c* that extends the first portion 117, with this second curvature 118*c* being extended by a straight portion 118*d*. In other words, this second curvature 118*c* is interposed between the first curvature 117*c* of the first portion 117 and the straight portion 18*d* of the second portion 118. As shown, the first curvature 117*c* of the first portion 117 and the second curvature 118*c* of the second portion 118 are curved in opposite directions. In other words, the first curvature 117*c* of the first portion 117 is convex when viewed from the axis of rotation R of the radial propeller and the second curvature 118*c* for its part is concave, when viewed from this axis of rotation R of the radial propeller. In other words, the first curvature 117*c* is inscribed in a circle, the center of which is disposed in an environment that surrounds the ventilation device according to the invention, while the second curvature 118*c* is inscribed in a circle, the center of which is disposed in the inner volume of the ventilation device according to the invention. For example, the second curvature 118*c* can have a curvature radius, measured in a plane perpendicular to the axis of rotation R of the radial propeller, over an angular sector of 45°, ranging between 23.1 mm and 34.7 mm. Advantageously, the second curvature 118*c* has a curvature radius that is equal to or substantially equal to 28.9 mm. As will be described hereafter, the second curvature 118*c* forms the part of the wall 114 of the housing 110 that is configured to straighten the air flow that exits the radial propeller 120**.

This results in this arrangement whereby, according to the example shown, the air flow enters the ventilation device 100 via the air inlet opening 111 in a first direction and exits this ventilation device 100 via the air outlet opening 112 in a second direction, parallel or substantially parallel to the first direction. According to the example shown herein, the first direction and the second direction are also parallel to the main extension axis D of the housing 110, and therefore also to the axis of rotation R of the radial propeller 120.

According to an embodiment that is not shown herein, provision can be made for the first curvature 117*c* to also be concave, when viewed from the axis of rotation R of the radial propeller 120.

Figure 3:
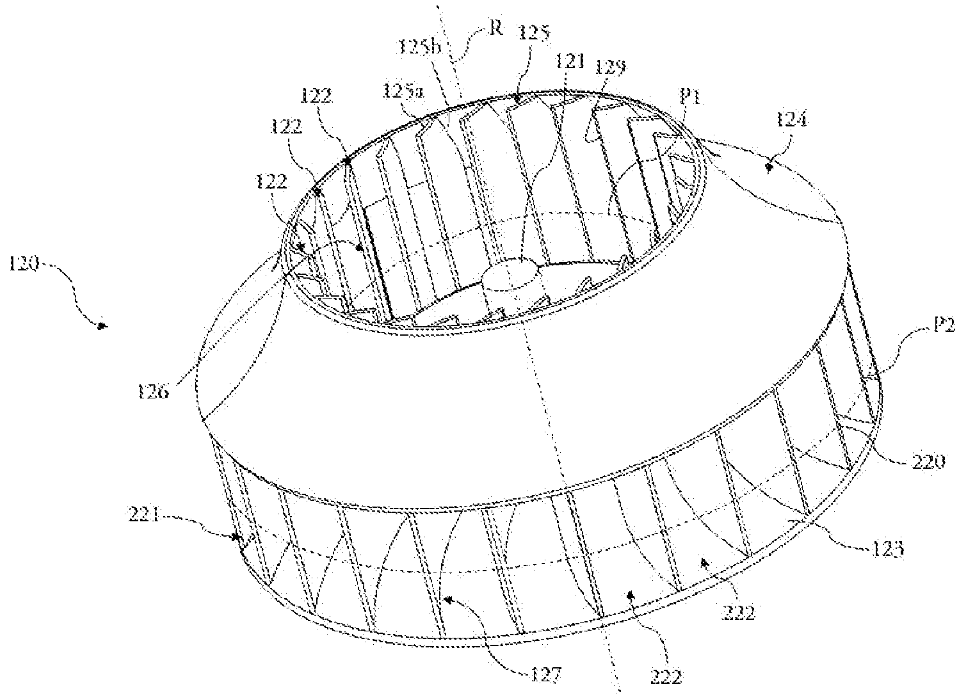
FIG. 3 shows a perspective view of a radial propeller of the ventilation device according to the invention.

FIG. 3 is a perspective view of the radial propeller 120 capable of being accommodated in the inner volume of the housing. Throughout the remainder of the description, the terms “radial propeller” and “propeller” will be used interchangeably.

The radial propeller 120 comprises a plurality of movable blades 122 connected together by virtue of a bowl 123 of the radial propeller 120, on the one hand, and by an edge 124 of this radial propeller, on the other hand. More specifically, each movable blade 122 comprises at least one upper line 125 oriented toward an air inlet 126 of the radial propeller 120 and at least one lower line 127 oriented away from the corresponding upper line 125. The edge 124 of the radial propeller 120 connects the upper lines 125 of the movable blades 122 of this propeller 120 and the bowl 123 for its part connects the lower lines 127 of these movable blades 122.

The upper lines 125 of the movable blades 122 more specifically comprise at least one first portion 125*a*, which projects from the edge 124, toward the axis of rotation R of the propeller 120, and a second portion 125*b*, in this case covered by the edge 124 of the propeller 120. Each movable blade 122 further comprises at least one inner edge 129 and at least one outer edge 220, which connect the upper line 125 to the lower line 127 of this movable blade 122, with the inner edges 129 of these movable blades 122 being oriented toward the axis of rotation R of the propeller 120 and the outer edges 220 being radially oriented away from this axis of rotation R.

The inner edges 129 of the movable blades 122 thus define an inner perimeter P1 of the propeller 120, while the outer edges 220 of these movable blades 122 define an outer perimeter P2 of the propeller 120. Advantageously, a portion of the edge 124 of the propeller helps to define the air inlet 126 of the propeller 120. According to the example shown, the inner edge 129 of at least one of the movable blades 122 forms a leading edge of the propeller 120. Advantageously, the inner edges 129 of each of the movable blades 122 form leading edges of the movable blades 122 of this propeller 120.

The bowl 123 of the propeller connects the lower lines 127 of the movable blades 122. As is partially shown in FIG. 3, the bowl 123 is closed. In other words, each space 222 formed between two successive movable blades 122 is closed. This bowl 123 of the propeller 120 will be described in further detail hereafter with reference to FIG. 8.

As mentioned, the radial propeller 120 comprises at least the air inlet 126, via which the air enters the propeller 120, in a direction parallel to the axis of rotation R of this propeller 120, and at least one radial air outlet 221, via which the air exits this propeller 120, in a direction transverse to the axis of rotation R of this propeller 120. According to the example shown herein, this radial air outlet 221 is formed on the outer perimeter P2 of the propeller 120, i.e., this radial air outlet 221 is axially defined on one side by the edge 124 of the propeller 120 and on the other side by the bowl 123 of this propeller 120. In other words, at least the outer edge 220 of at least one movable blade 122 forms a trailing edge of the radial propeller 120. Advantageously, the outer edges 220 of all the movable blades 122 respectively form a trailing edge of the radial propeller 120. With the bowl 123 of the propeller 120 being closed, it is understood that the entire air flow generated by the rotation of the propeller 120 exits this propeller 120 via the radial air outlet 221.

Finally, according to the example shown in FIG. 3, the movable blades 122 of the propeller 120 each have a curved shape, i.e., they extend in the form of an arc of a circle between their inner edge 129 and their outer edge 220. Advantageously, the propeller 120 can be one-piece, i.e., can form a single assembly that cannot be separated without causing damage to the hub 121, the movable blades 122, the bowl 123 and/or the edge 124 of the propeller 120.

Figure 4:
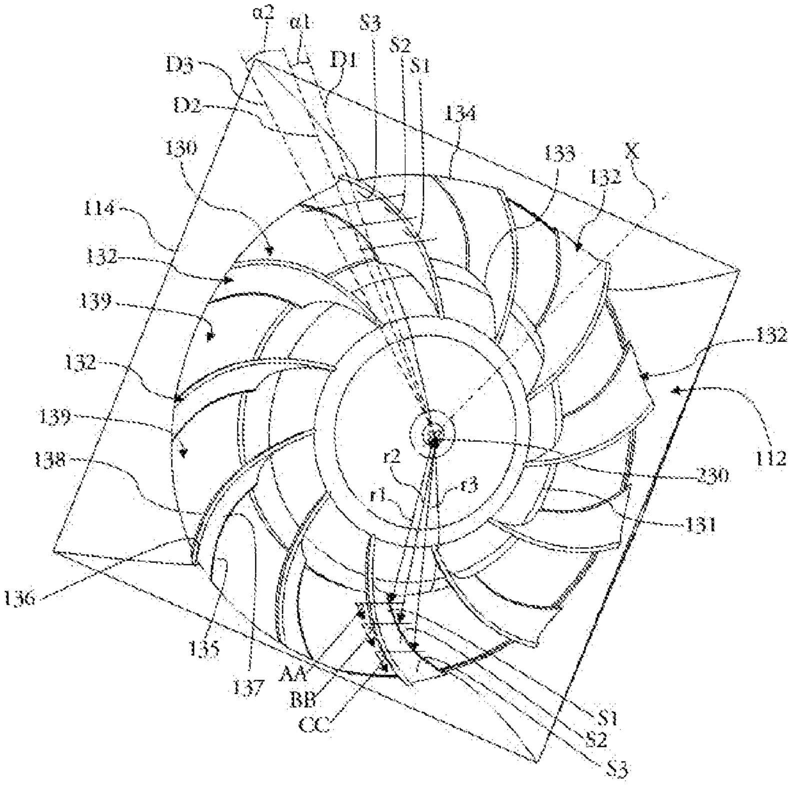
FIG. 4 shows a perspective and bottom view of an air guide member of the ventilation device according to the invention.

According to the invention, the ventilation device 100 also comprises the air flow guide member 130 capable of directing the air flow toward the axis of rotation R of the radial propeller, downstream thereto. FIG. 4 shows an embodiment of this guide member 130. More specifically, FIG. 4 is a bottom perspective view of this guide member 130 shown in conjunction with a portion of the wall 114 of the housing.

According to the example shown, the air flow guide member 130 is radially interposed between the support 131 of the movement component and the wall 114 of the housing. This guide member 130 is more specifically formed by a plurality of fixed blades 132, which respectively extend between the support 131 and the wall 114 of the housing. Each of these fixed blades 132 extends along a radial extension axis X between an inner end 133 in contact with the support 131 and an outer end 134 in contact with the wall 114. For example, at least one inner end 133 of one of the fixed blades 132 is rigidly connected to the support 131, with the outer end 134 of this fixed blade 132 being rigidly connected to the wall 114. According to the example shown, all the inner ends 133 of the fixed blades 132 are rigidly connected to the support 131 and all the outer ends 134 of these fixed blades 132 are rigidly connected to the wall 114. For example, the guide member 130, the support 131 and the wall 114 of the housing can be integrally formed, i.e., they form a single assembly that cannot be separated without damaging the guide member 130, the support 131 or the wall 114.

Each of the fixed blades 132 also comprises at least one leading edge 135, via which the air flow enters the guide member 130, and at least one trailing edge 136, via which the air flow exits this guide member 130. The leading edge 135 is thus oriented toward the air inlet opening formed in the housing when the guide member 130 is in position in this housing, and the trailing edge 136, for its part, is oriented toward the outlet opening 112 of this housing. The leading edge 135 and the trailing edge 136 are also connected together by a pressure face 137 and by a suction face 138.

Advantageously, these fixed blades 132 can be distributed evenly, i.e., a space 139, which separates the pressure face 137 of a first fixed blade 132 from the suction face 138 of a second fixed blade 132 following this first fixed blade 132, can have equivalent, or substantially equivalent, dimensions to the dimensions of the space 139 that separates the pressure face 137 of the second fixed blade 132 from the suction face of a third fixed blade 132 that immediately follows the second fixed blade 132.

As described in further detail hereafter, each of these fixed blades 132 can be virtually shared in at least three portions S1, S2, S3 that have specific features, which allow each of these fixed blades 132 to direct the air flow toward the axis of rotation of the radial propeller.

Figure 5:
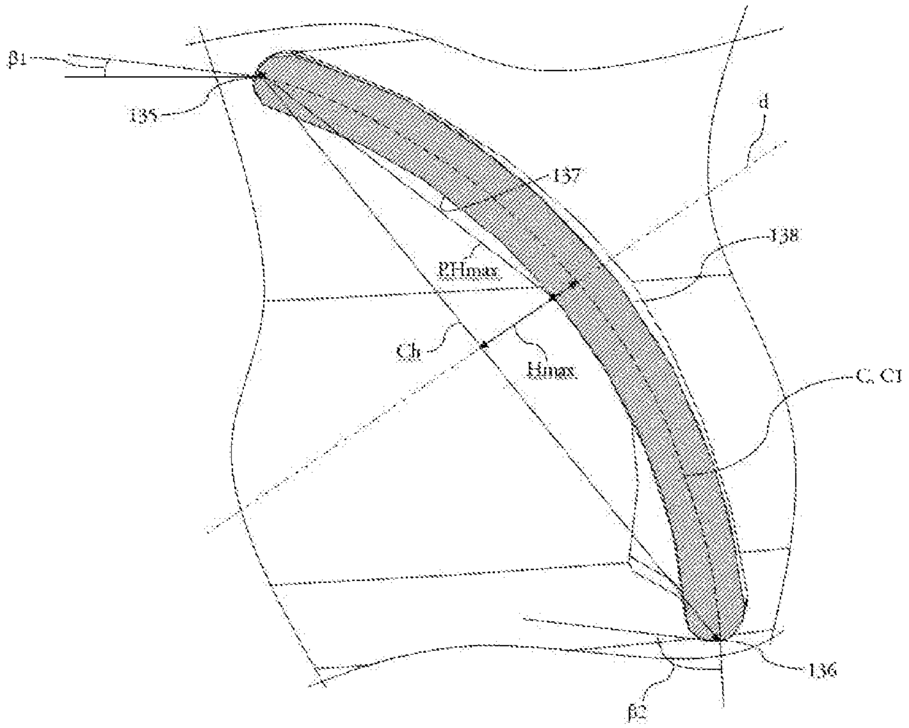
FIG. 5 shows a cross-section, produced along a first transverse plane AA shown in FIG. 4, of a first section of a fixed blade of the air flow guide member shown in FIG. 4.
Figure 6:
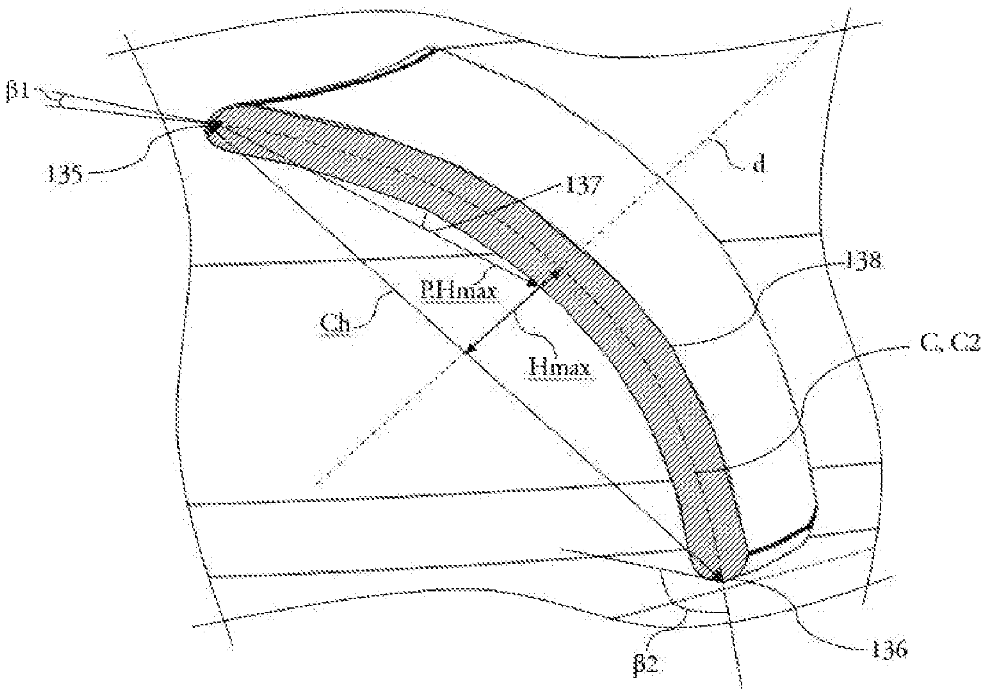
FIG. 6 shows a cross-section, produced along a second transverse plane BB shown in FIG. 4, of a second section of the fixed blade of the air flow guide member shown in FIG. 5.
Figure 7:
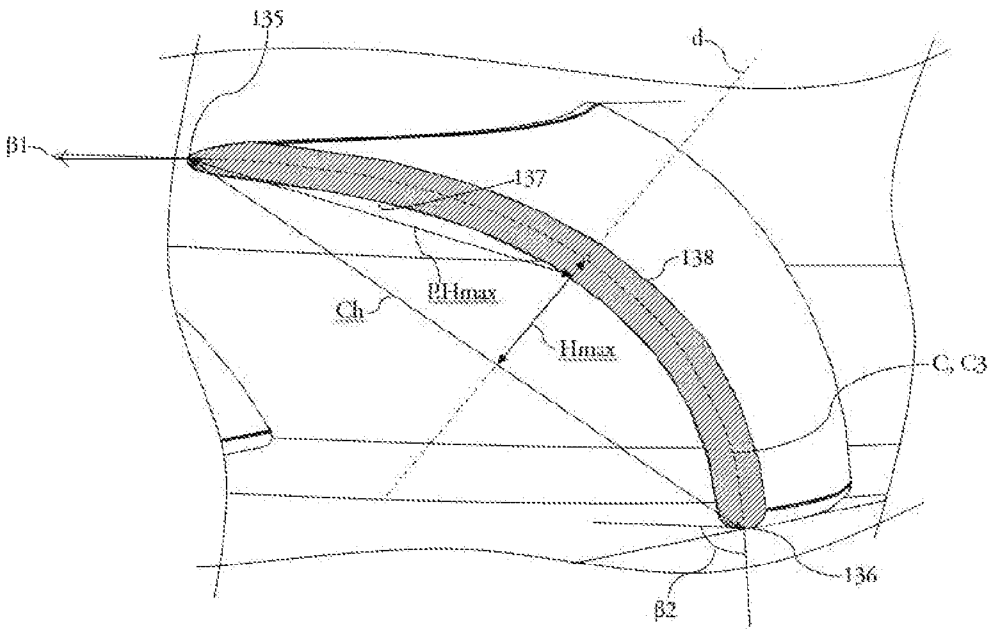
FIG. 7 shows a cross-section, produced along a third transverse plane CC shown in FIG. 4, of a third section of the fixed blade of the air flow guide member shown in FIG. 5.

With reference to FIG. 4, FIG. 5 shows a cross-section of a first portion S1 of one of these fixed blades 132, FIG. 6 shows a cross-section of a second portion S2 of the same fixed blade 132 and FIG. 7 shows a cross-section of a third portion S3 of this fixed blade 132, with the cross-section of the first portion S1 being made along a first transverse plane AA located at a first distance r1 from a center 230 of the guide member 130, the cross-section of the second portion S2 being made along a second transverse plane BB located at a second distance r2 from the center 230 of the guide member 130 and the cross-section of the third portion S3 being made along a third transverse plane BB located at a third distance r3 from the center 230 of the guide member 130, with the first transverse plane AA, the second transverse plane BB and the third transverse plane BB each being perpendicular to the radial extension axis X of the relevant fixed blade 132. As shown, the first distance r1, the second distance r2 and the third distance r3 are measured between the center 230 of the guide member 130, in this case coincident with a center of the support 131 of the component for moving the propeller, and the leading edge 135 of the relevant fixed blade 132. According to the example shown herein, the first distance r1 is equal, or substantially equal, to 80 mm, the second distance r2 is equal, or substantially equal, to 90 mm and the third distance r3 is equal, or substantially equal, to 100 mm. In other words, the first portion S1, the second portion S2 and the third portion S3 of a fixed blade 132 are aligned, in this order along the radial extension axis X of the relevant fixed blade 132, between the inner end 133 of the relevant fixed blade 132 and the outer end 134 of this fixed blade 132.

According to the example shown, a first angular offset α1 measured between a first straight line D1 passing through the leading edge 135 in the first portion S1 and a second straight line D2 passing through the leading edge 135 in the second portion S2 ranges between 2.5° and 4.5°. A second angular offset α2 measured between the second straight line D2 and a third straight line D3 passing through the leading edge 135 in the third portion S3 ranges between 3° and 5°. More specifically, the first straight line D1 passes through the center 230 of the guide member and a point of the leading edge 135 of the fixed blade 132 located at the first distance r1 from this center 230 of the guide member, the second straight line D2 passes through the center 230 of the guide member and a point of the leading edge 135 of the fixed blade 132 located at the second distance r2 from this center 230, and the third straight line D3 passes through the center 230 of the guide member and a point of the leading edge 135 of the fixed blade 132 located at the third distance r3 from this center 230.

With reference to FIGS. 5 to 7, the features common to the cross-sections of each of these three portions S1, S2, S3 will be described first before providing the features specific to each portion.

Thus, as described above, each fixed blade 132 comprises a pressure face 137 and a suction face 138 connected together by a leading edge 135 and by a trailing edge 136. It should be noted that the cross-section of a fixed blade 132 extends along a camber line C between the leading edge 135 and the trailing edge 136. This camber line C is inscribed in a circle C1, C2, C3, schematically and partially shown as dashed lines in the figures.

The cross-sections of the fixed blades 132 have a certain number of common dimensions. In particular, each fixed blade 132 has at least one chord line Ch and at least one maximum camber Hmax. The chord line Ch of a fixed blade 132 corresponds to the straight portion that extends between the leading edge 135 and the trailing edge 136 of this fixed blade 132. According to the example shown herein, the dimensions of this chord line Ch range between 20.2 mm and 30.4 mm. The maximum camber Hmax of a fixed blade 132 for its part corresponds to a dimension of this fixed blade 132 measured between the chord line Ch and the camber line C, parallel to a straight line d that extends perpendicular to the chord line Ch and that intersects the camber line C, with the maximum camber Hmax corresponding to the largest dimension that can be measured thus. According to the example shown, the maximum camber Hmax ranges between 3.1 mm and 4.7 mm. Also, a distance P.Hmax measured between the leading edge 135 of the fixed blade 132 and an intersection point between the pressure face 137 and the straight line d perpendicular to the aforementioned chord line Ch and along which the maximum camber Hmax is measured, ranges between 10 mm and 15.2 mm.

The cross-sections of the portions of each fixed blade 132 are also characterized by a ratio between a first angle β1 measured between the camber line C at the leading edge 135 of the fixed blade 132 and a tangent to the circle C1, C2, C3 at the leading edge 135 of this fixed blade 132, and a second angle β2 measured between the camber line C at the trailing edge 136 and the tangent to the circle C1, C2, C3 at the leading edge 135 of this fixed blade 132.

According to the example shown, the ratio between the first angle β1 and the second angle β2 measured in the first portion S1 ranges between 0.03 and 0.07, the ratio between the first angle β1 and the second angle β2 measured in the second portion S2 ranges between 0.05 and 0.12 and the ratio between the first angle β1 and the second angle β2 measured in the third portion S3 ranges between 0.02 and 0.07. In other words, this ratio is substantially identical in the first portion S1 and in the third portion S3 and it is greater in the second portion S2.

These various ratios express the evolution of the curvature assumed by each of the fixed blades 132 of the guide member 130 and that allow the air flow to be guided toward the axis of rotation of the radial propeller. The operation of the ventilation device 100 according to the invention is described in further detail hereafter with reference to FIG. 8.

For example, the first angle β1 measured in the first portion S1 ranges between 4° and 6.2° and the second angle β2 measured in this first portion S2 ranges between 85° and 128°. The first angle β1 measured in the second portion S2 for its part can range between 6° and 9.3° and the second angle β2 measured in this second portion S2 ranges between 79.5° and 119.3°. Finally, the first angle β1 measured in the third portion S3 ranges between 3.4° and 5.2° and the second angle β2 measured in the third portion S3 ranges between 79.4° and 119.3°.

Figure 8:
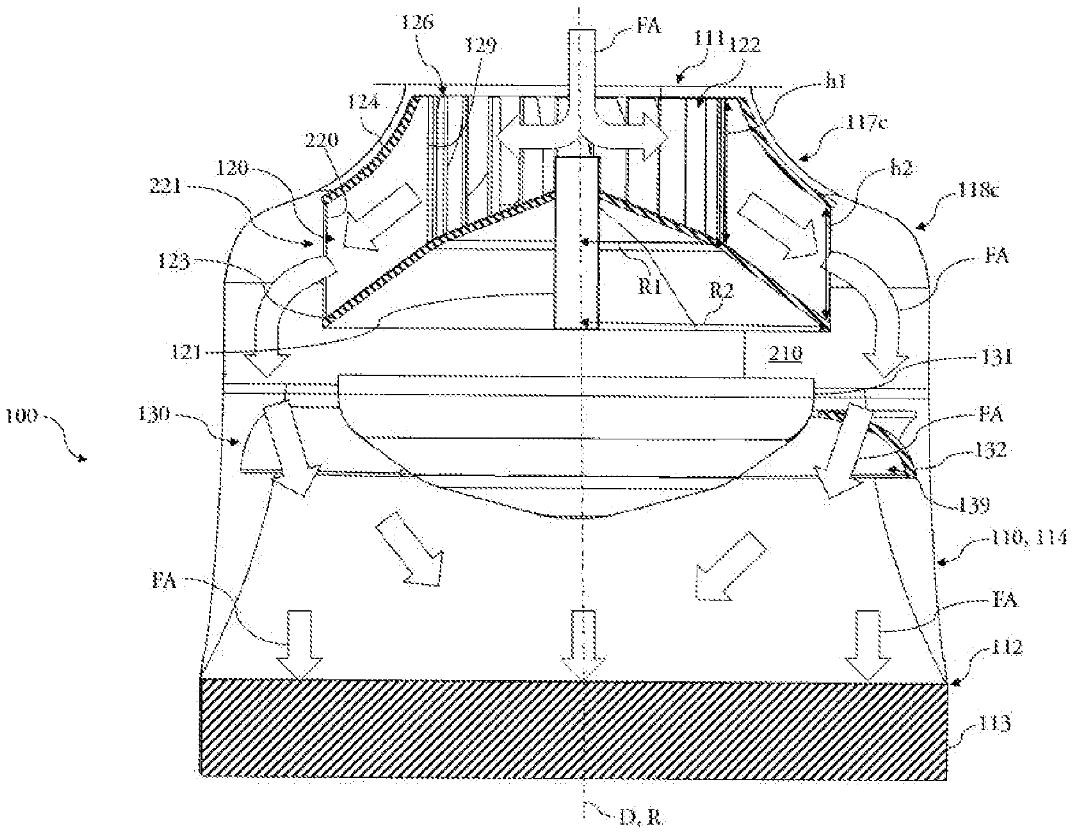
FIG. 8 shows a vertical cross-section view, produced along a vertical plane DD shown in FIG. 1, of the ventilation device according to the invention.

FIG. 8 shows the ventilation device 100 as a vertical cross-section made along a vertical plane DD shown, for example, in FIG. 2, and thus shows the inner volume 210 of the housing 110, as well as the arrangement, in particular, of the propeller 120 and of the air flow guide member 130 inside this inner volume 210 of the housing 110.

As mentioned above, the housing 110 extends along a main extension line D, between an air inlet opening 111 and an air outlet opening 112. The air inlet opening 111, the propeller 120, the guide member 130 and the air outlet opening 112 are aligned, in this order, along the main extension line D of the housing 110.

The propeller 120 is more specifically arranged so that its air inlet 126 emerges at the air inlet opening 111 formed in the wall 114 of the housing 110. The support 131 of the component for moving the propeller 120 and the air guide member 130 are arranged under this propeller 120, i.e., between this propeller 120 and the air outlet opening 112, with this air guide member 130 being interposed between the support 131 of the movement component and the wall 114 of the housing 110. As described above, the movement component, not shown herein, can assume the form of an electric motor and can comprise a drive shaft that extends into the hub 121 of the propeller 120. Thus, the drive shaft rotates the hub 121, thereby rotating the whole propeller 120, and in particular the movable blades 122 of this propeller 120, so as to generate the air flow FA.

As described above, the movable blades 122 of the propeller 120 extend between the bowl 123 of the propeller 120 and the edge 124 of this propeller 120. The bowl 123 of the propeller 120 has, when viewed from the inner perimeter of the propeller 120, a convex shape. This bowl 123 is also traversed by the hub 121 of the propeller 120 capable of accommodating the drive shaft of the movement component. As shown, the outer edge 220 of at least one movable blade 122 of the propeller 120 extends parallel to the axis of rotation R of the propeller 120. Advantageously, the outer edges 220 of all the movable blades 122 respectively extend parallel to the axis of rotation R of the propeller 120.

It also should be noted that the inner edge 129 and the outer edge 220 of each movable blade 122 have different heights and a different position. A "different position" is understood to mean the fact that the inner edge 129 of a movable blade 122 and the outer edge 220 of this movable blade 122 have an offset, along the axis of rotation R of the propeller 120, relative to each other. The "height of an edge" is understood to mean a dimension of this edge measured parallel to the axis of rotation R of the propeller, between the bowl 123 and the edge 124 of this propeller 120. Thus, the height h1 of the inner edge 129 of a movable blade 122 of the propeller 120 is greater than the height h2 of the outer edge 220 of this propeller 120. In particular, provision can be made, for example, for the height h1 of the inner edge 129 of a movable blade 122 to range between 36.6 mm and 55 mm and for the height h2 of the outer edge 220 of this same movable blade 122 to range between 29 mm and 44 mm. In other words, a ratio between the height h1 of the inner edge 129 of a blade and the height h2 of the outer edge 220 of this movable blade 122 ranges between 1.1 and 1.9. The propeller 120 also can be characterized by an inner radius R1, with this inner radius R1 being measured in a plane perpendicular to the axis of rotation R of the propeller 120, between the axis of rotation R of the propeller 120 and a point of the bowl 123 located to the right of the inner edge 129 of one of the movable blades 122 of the propeller 120. In other words, this inner radius R1 is measured between a center of the hub 121 and the inner edge 129 of one of the movable blades 122 of the propeller 120. For example, the inner radius R1 of the propeller 120 ranges between 36 mm and 54 mm. Finally, the propeller 120 has an outer radius R2 measured in the plane perpendicular to the axis of rotation R of the propeller 120, between this axis of rotation R and a point of the bowl 123 located to the right of the outer edge 220 of one of the movable blades 122 of this propeller 120. For example, the outer radius R2 of the propeller 120 can range between 64 mm and 96 mm.

As shown, this air flow FA enters the housing 110 via the air inlet opening 111, then enters the propeller 120 via the air inlet 126 of this propeller 120, before being discharged via the radial air outlet 221 of this propeller 120. The first curvature 117*c* of the wall 114 of the housing 110 covers the edge 124 of the propeller 120 and the second curvature 118*c* of this wall 114 is arranged facing the radial air outlet 221 of the propeller 120.

The air flow FA that exits the propeller 120 thus meets the second curvature 118*c* of the wall 114 thereby causing the path of this air flow FA to change, which is thus directed toward the air flow guide member 130. In order to allow this straightening of the air flow FA when exiting the radial propeller 120, the second curvature 118*c* has, as previously described, a curvature radius ranging between 23.1 mm and 34.7 mm, advantageously equal to or substantially equal to 28.9 mm. The air flow FA then enters the guide member 130 via the leading edges 135 of the fixed blades 132 of this guide member. As described above, these fixed blades 132 have a particular shape that allows at least part of the air flow FA that joins the guide member 130 to be deviated in order to direct it toward the axis of rotation R of the propeller 120. The shape of these fixed blades 132 is also such that another part of the air flow is hardly deviated or is not deviated by its passage through the guide member 130. In other words, it will be understood that the shape of the wall 114 of the housing 110 and the shape of the fixed blades 132 of the guide member 130, as well as the spaces 139 formed between the successive fixed blades 132 of the guide member 130, allow the air flow FA to be directed so that the general direction of the air flow is between the air inlet 126 of the propeller 120 and the air outlet opening 112 formed in the wall 114 parallel to the main extension line D of the housing 110, which itself is coincident with the axis of rotation R of the propeller 120. Advantageously, the air flow FA is thus directed over the entire surface of the air outlet opening 112, including at its center where the axis of rotation R passes, which allows the entire surface of the air filter 113 to be used that covers this air outlet opening 112, thus improving the efficiency and the durability of this air filter 113.

It can be understood from the above that the present invention proposes a ventilation device in which the air flow moves in a single general direction between the air inlet of the propeller and the air outlet opening of the housing.

However, the present invention is not limited to the means and configurations described and illustrated herein and it also extends to any equivalent means and configuration, as well as to any technically operative combination of such means. In particular, the shape and the features of the radial propeller and of the air flow guide member could be modified without detriment to the invention insofar as they meet the functionalities described in the present document.

What is claimed is:

1. A ventilation device for a vehicle ventilation, heating and/or air-conditioning system, comprising:

at least one housing, which includes at least one wall defining an inner volume, in which at least one radial propeller capable of being rotated and at least one air flow guide member are accommodated, the at least one radial propeller and the at least one air flow guide member being configured to generate an air flow having a general direction parallel to an axis of rotation of the at least one radial propeller between an air inlet of the at least one radial propeller and an air outlet opening formed in the at least one wall of the at least one housing of the ventilation device, with at least part of the wall of the at least one housing being configured to straighten the air flow exiting the at least one radial propeller, wherein the at least one air flow guide member is configured to direct the air flow away from the at least one wall of the housing and toward the axis of rotation of the at least one radial propeller, wherein the at least one housing of the ventilation device includes at least one upper part that houses the at least one radial propeller and a lower part that houses the at least one air flow guide member, wherein the upper part has an outer concave surface, an outer convex surface, and an outer flat surface adjacent to each other in direct and respective succession, and wherein an air filter closes the air outlet opening, the at least one air flow guide member directs the air flow toward the axis of rotation and such that the air flow is distributed over substantially an entire surface of the air filter.

2. The ventilation device as claimed in claim 1, wherein the at least one air flow guide member includes a plurality of fixed blades axially disposed between the at least one radial propeller and the air outlet opening.

3. The ventilation device as claimed in claim 2, wherein at least one fixed blade of the air flow guide member includes at least one outer end rigidly connected to the at least one wall of the at least one housing.

4. The ventilation device as claimed in claim 1, wherein the at least one radial propeller includes a plurality of movable blades, with each movable blade including an inner edge oriented toward the axis of rotation of the at least one radial propeller and an outer edge oriented away from the inner edge, with at least one outer edge extending parallel to the axis of rotation of the at least one radial propeller.

5. The ventilation device as claimed in claim 4, wherein an inner radius of the at least one radial propeller, measured between the axis of rotation of the at least one radial propeller and the inner edge of one of the movable blades of the at least one radial propeller in a plane perpendicular to the axis of rotation of the at least one radial propeller, ranges between 36 mm and 54 mm.

6. The ventilation device as claimed in claim 4, wherein the inner edge of a each movable blade has a height, measured parallel to the axis of rotation of the at least one radial propeller, that is greater than a height of the outer edge of each movable blade, measured parallel to the axis of rotation of the at least one radial propeller.

7. The ventilation device as claimed in claim 1, wherein the at least one air flow guide member includes a plurality of fixed blades, with at least one fixed blade of the at least one air flow guide member including a pressure face and a suction face connected together by a leading edge and a trailing edge, the fixed blade including a cross-section, when viewed in a plane perpendicular to a radial extension axis of the respective fixed blade, that extends along a camber line between the leading edge and the trailing edge, with this camber line being inscribed in a circle, with a first angle being formed between a tangent to the circle at the leading edge and the camber line at the leading edge and a second angle being formed between the tangent to the circle at the leading edge and the camber line at the trailing edge, the first angle ranging between 3° and 10° and the second angle ranging between 79° and 128°.

8. The ventilation device as claimed in claim 7, wherein at least one fixed blade of the at least one air flow guide member includes a first portion, a second portion and a third portion aligned in this order along the radial extension axis of the at least one fixed blade toward the at least one wall of the at least one housing, with a ratio between the first angle and the second angle measured in the first portion ranging between 0.03 and 0.07, the ratio between the first angle and the second angle measured in the second portion ranging between 0.05 and 0.12 and the ratio between the first angle and the second angle measured in the third portion ranging between 0.02 and 0.07.

9. The ventilation device as claimed in claim 1, including at least one movement component, wherein the at least one radial propeller is capable of being rotated by the at least one movement component, the at least one housing including at least one support capable of accommodating the at least one movement component for moving the at least one radial propeller, and wherein the at least one air guide member is interposed between the at least one support capable of accommodating the at least one movement component and the at least one wall of the at least one housing.

10. The ventilation device as claimed in claim 9, wherein the at least one air flow guide member includes a plurality of fixed blades and wherein at least one fixed blade of the at least one air flow guide member includes at least one inner end rigidly connected to the at least one support capable of accommodating the at least one movement component and at least one outer end rigidly connected to the at least one wall of the at least one housing.

11. A ventilation, heating and/or air-conditioning system for a vehicle, comprising a ventilation device including at least one housing, which includes at least one wall defining an inner volume, in which at least one radial propeller capable of being rotated and at least one air flow guide member are accommodated, the at least one radial propeller and the at least one air flow guide member being configured to generate an air flow having a general direction parallel to an axis of rotation of the at least one radial propeller between an air inlet of the at least one radial propeller and an air outlet opening formed in the at least one wall of the at least one housing of the ventilation device, with at least part of the wall of the at least one housing being configured to straighten the air flow exiting the at least one radial propeller, wherein the at least one air flow guide member is configured to direct the air flow away from the at least one wall of the housing and toward the axis of rotation of the at least one radial propeller and at least one heat exchanger configured to exchange heat between the air flow channeled by the ventilation device and a coolant, wherein the at least one housing of the ventilation device includes at least one upper part that houses the at least one radial propeller and a lower part that houses the at least one air flow guide member, wherein the upper part has an outer concave surface, an outer convex surface, and an outer flat surface adjacent to each other in direct and respective succession, and wherein an air filter closes the air outlet opening, the at least one air flow guide member directs the air flow toward the axis of rotation and such that the air flow is distributed over substantially an entire surface of the air filter.

12. The ventilation device as claimed in claim 11, wherein the at least one air flow guide member includes a plurality of fixed blades axially disposed between the at least one radial propeller and the air outlet opening.

13. The ventilation device as claimed in claim 12, wherein at least one fixed blade of the air flow guide member includes at least one outer end rigidly connected to the at least one wall of the at least one housing.

14. The ventilation device as claimed in claim 12, wherein the at least one radial propeller includes a plurality of movable blades, with each movable blade including an inner edge oriented toward the axis of rotation of the at least one radial propeller and an outer edge oriented away from the inner edge, with at least one outer edge extending parallel to the axis of rotation of the at least one radial propeller.

15. A ventilation device for a vehicle ventilation, heating and/or air-conditioning system, comprising at least one housing, which includes at least one wall defining an inner volume, in which at least one radial propeller capable of being rotated and at least one air flow guide member are accommodated, the at least one radial propeller and the at least one air flow guide member being configured to generate an air flow having a general direction parallel to an axis of rotation of the at least one radial propeller between an air inlet of the at least one radial propeller and an air outlet opening formed in the at least one wall of the at least one housing of the ventilation device, with at least part of the wall of the at least one housing being configured to straighten the air flow exiting the at least one radial propeller, wherein the at least one air flow guide member is configured to direct the air flow away from the at least one wall of the housing and toward the axis of rotation of the at least one radial propeller wherein the at least one housing of the ventilation device includes at least one upper part that houses the at least one radial propeller and a lower part that houses the at least one air flow guide member;

wherein the upper part has an outer concave surface, an outer convex surface, and an outer flat surface adjacent to each other in direct and respective succession.

16. The ventilation device as claimed in claim 15, wherein an air filter closes the air outlet opening, the at least one air flow guide member directs the air flow such that the air flow is distributed over substantially an entire surface of the air filter.

17. The ventilation device as claimed in claim 15, wherein the at least one radial propeller includes a plurality of movable blades, with each movable blade including an inner edge oriented toward the axis of rotation of the at least one radial propeller and an outer edge oriented away from the inner edge, with at least one outer edge extending parallel to the axis of rotation of the at least one radial propeller.

18. The ventilation device as claimed in claim 15, wherein the at least one air flow guide member includes a plurality of fixed blades and wherein at least one fixed blade of the at least one air flow guide member includes at least one inner end rigidly connected to at least one support capable of accommodating at least one movement component and at least one outer end rigidly connected to the at least one wall of the at least one housing.

19. The ventilation device as claimed in claim 15, wherein the at least one air flow guide member is axially disposed between the at least one radial propeller and the air outlet opening and is configured to direct the air flow toward the axis of rotation of the at least one radial propeller.

20. The ventilation device as claimed in claim 17, wherein the inner edge of each movable blade has a height, measured parallel to the axis of rotation of the at least one radial propeller, that is greater than a height of the outer edge of each movable blade, measured parallel to the axis of rotation of the at least one radial propeller.

* * * * *